(12) United States Patent
Brelje et al.

(10) Patent No.: US 12,515,806 B2
(45) Date of Patent: Jan. 6, 2026

(54) AIRCRAFT PROPULSION SYSTEM WITH INTEGRATED FUEL CELL COOLING

(71) Applicant: Joby Aero, Inc., Santa Cruz, CA (US)

(72) Inventors: Benjamin Brelje, Ann Arbor, MI (US); Robert Gulliver Lynn, Auckland (NZ); Jeffrey Allen Lotterman, Los Angeles, CA (US); Gregor Veble Mikic, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/398,806

(22) Filed: Dec. 28, 2023

(65) Prior Publication Data

US 2024/0217665 A1 Jul. 4, 2024

Related U.S. Application Data

(60) Provisional application No. 63/477,492, filed on Dec. 28, 2022.

(51) Int. Cl.
*B64D 27/355* (2024.01)
*B64D 33/10* (2006.01)
*F02C 7/12* (2006.01)
*F02C 7/141* (2006.01)

(52) U.S. Cl.
CPC ........... *B64D 27/355* (2024.01); *B64D 33/10* (2013.01); *F02C 7/12* (2013.01); *F02C 7/141* (2013.01)

(58) Field of Classification Search
CPC .. F02C 7/141; F02C 7/18; F02C 7/185; F02C 7/32; B64D 27/355; F05D 2260/213; F05D 2260/204; F05D 2220/20; F05D 2220/32
See application file for complete search history.

(56) References Cited

U.S. PATENT DOCUMENTS

| 3,185,181 | A | 5/1965 | Demyan |
| 11,565,607 | B2 | 1/2023 | Mikic et al. |
| 11,752,899 | B2 | 9/2023 | Mikic et al. |
| 11,876,263 | B1* | 1/2024 | Wang ............... B64D 33/10 |
| 2003/0230671 | A1 | 12/2003 | Dunn |

(Continued)

FOREIGN PATENT DOCUMENTS

| EP | 1354794 | 10/2003 |
| JP | H10122208 | 5/1998 |

OTHER PUBLICATIONS

Feng, Jianmei, "Designing Hydrogen Recirculation Ejectors for Proton Exchange Membrane Fuel Cell Systems", Energies Journal, (Jan. 21, 2023), 11 pgs.

(Continued)

*Primary Examiner* — Thuyhang N Nguyen
(74) *Attorney, Agent, or Firm* — SCHWEGMAN LUNDBERG & WOESSNER, P.A.

(57) ABSTRACT

An aircraft includes a fuel cell system including a fuel cell powered by hydrogen received from a supply of hydrogen, and a propulsion unit including a conduit through which a flow of air is propelled. A first heat exchanger transfers heat from the fuel cell to a coolant fluid located in a coolant loop, and a second heat exchanger is located in the conduit for heating the air passing through the conduit by transferring heat to the air from the coolant fluid via the second heat exchanger. This configuration serves to cool the fuel cell while increasing the efficiency of the propulsion unit.

13 Claims, 9 Drawing Sheets

(56) References Cited

U.S. PATENT DOCUMENTS

| | | | |
|---|---|---|---|
| 2004/0040312 A1* | 3/2004 | Hoffjann | H01M 8/04089 |
| | | | 60/784 |
| 2016/0036071 A1* | 2/2016 | Klewer | H01M 8/04044 |
| | | | 429/435 |
| 2016/0177829 A1* | 6/2016 | Loebig | F28D 9/0037 |
| | | | 415/177 |
| 2016/0222886 A1* | 8/2016 | Riehle | F02K 3/105 |
| 2017/0159674 A1 | 6/2017 | Maciolek | |
| 2019/0136761 A1* | 5/2019 | Shapiro | H01M 8/04201 |
| 2020/0385127 A1* | 12/2020 | Devault | B64D 13/08 |
| 2022/0009379 A1 | 1/2022 | Mikic et al. | |
| 2023/0238552 A1* | 7/2023 | Wang | H01M 8/04268 |
| 2024/0116647 A1* | 4/2024 | Zimmermann | B64D 33/10 |

OTHER PUBLICATIONS

Han, Jiquan, "A review of key components of hydrogen recirculation subsystem for fuel cell vehicles", Energy Conversion and Management: X 15, (2022), 16 pgs.

Mikic, Gregor Veble, "Fuselage Boundary Layer Ingestion Propulsion Applied to a Thin Haul Commuter Aircraft for Optimal Efficiency", American Institute of Aeronautics and Astronautics, AIAA 2016-3764, (Jun. 10, 2016), 20 pgs.

"International Application Serial No. PCT US2023 086206, International Search Report mailed Apr. 18, 2024", 5 pgs.

"International Application Serial No. PCT US2023 086206, Written Opinion mailed Apr. 18, 2024", 10 pgs.

\* cited by examiner

AIRCRAFT PROPULSION SYSTEM WITH INTEGRATED FUEL CELL COOLING

RELATED APPLICATION DATA

This application claims the benefit of U.S. Provisional Patent Application No. 63/477,492 filed on Dec. 28, 2022, the contents of which are incorporated herein by reference as if explicitly set forth.

TECHNICAL FIELD

This invention relates generally to the field of fuel cells fueled by hydrogen, including for example for use in electrically-powered or hybrid-powered aircraft.

BACKGROUND

A fuel cell is an electrochemical cell that converts the chemical energy of a fuel (often hydrogen) and an oxidizing agent (often oxygen) into electricity through a pair of redox reactions. Fuel cells have been used to generate electrical power in many applications. Fuel cells are used for primary and backup power for commercial, industrial, and residential buildings and in remote or inaccessible areas. They are also used to power fuel cell vehicles, including forklifts, automobiles, buses, trains, boats, motorcycles, and submarines.

Fuel cell vehicles are powered by hydrogen that is fed into an onboard fuel cell "stack," which transforms the hydrogen's chemical energy into electrical energy. This electricity is then available to power the vehicle and its onboard systems.

Hydrogen supplied to a fuel cell enters the anode, where it comes in contact with a catalyst that promotes the separation of hydrogen atoms into an electron and proton. The electrons are gathered by the conductive current collector, which is connected to the vehicle's high-voltage circuitry, feeding an onboard battery and/or electric motors that propel the vehicle. The byproduct of the reaction occurring in the fuel cell stack is water vapor, which is emitted through an exhaust.

Also included in fuel cell powered vehicles is a "balance-of-plant," which contains all of the other components of a fuel cell system except the stack itself. This includes pumps, sensors, heat exchanger, gaskets, compressors, recirculation blowers or humidifiers, and so forth.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The following description of examples of the invention is not intended to limit the invention to these examples, but rather to enable any person skilled in the art to make and use this invention.

The propulsive effect of air passing through a ducted fan can be increased by adding heat to the air, while a fuel cell can also usefully be cooled by transferring heat generated by the fuel cell to the air in the ducted fan. Accordingly, provided in some examples is a heat exchange loop for circulating a coolant to alternately cool the fuel cell and heat the air in the ducted fan. In some examples the ducted fan is a circular or nearly-circular podded propulsor unit similar in outward appearance to an installed turbofan engine. In another example, the ducted fan is embedded into the upper surface of a wing as part of an array of ducts. In further examples, multiple heat exchanger units may be provided in series in the ducted fan.

Figure 1:
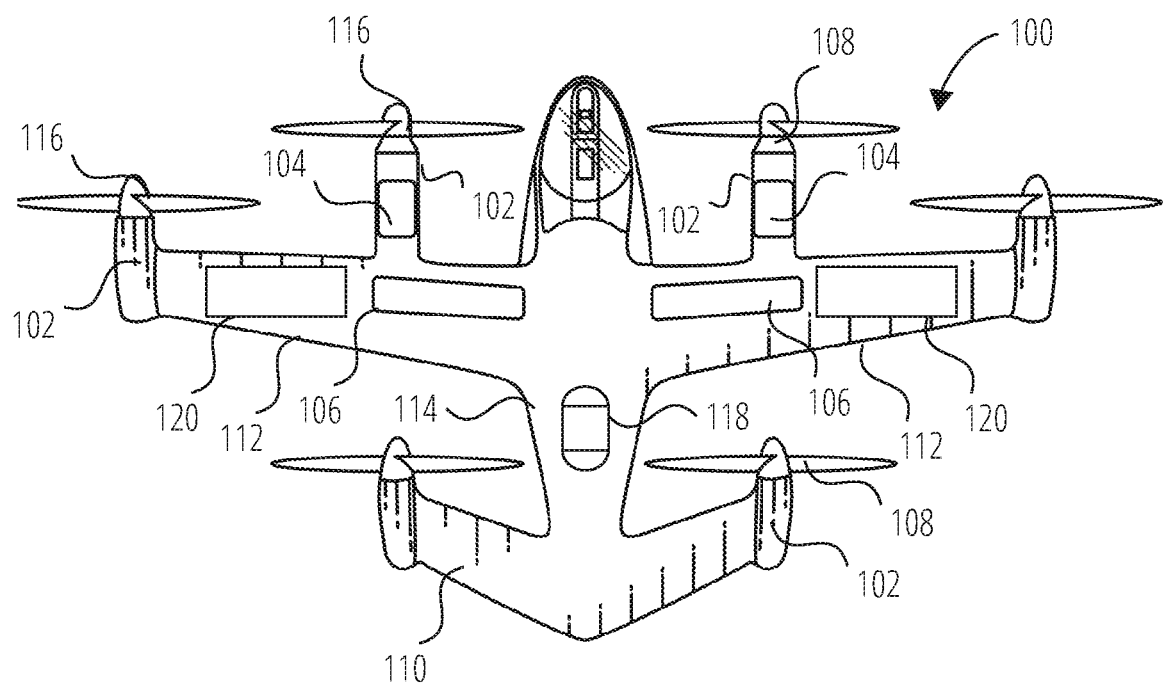
FIG. 1 is a plan view of an aircraft according to some examples.

FIG. 1 is a plan view of an aircraft 100 according to some examples. The aircraft 100 includes a fuselage 114, two wings 112, an empennage 110, and propulsion systems 108 embodied as rotor assemblies 116 located in nacelles 102. Alternatively, the propulsion systems are embodied as ducted fans, as discussed in more detail below. The aircraft 100 includes one or more fuel cell power sources embodied in FIG. 1 as nacelle fuel cell stacks 104 and wing fuel cell stacks 106, although cell stacks could also be provided in the fuselage 114. One or more heat exchangers 120 are located in the wings 112 and/or fuselage 114 or other locations. The aircraft 100 will also typically include associated equipment such as an electronic infrastructure, control surfaces, a cooling system, landing gear and so forth.

The wings 112 function to generate lift to support the aircraft 100 during forward flight. The wings 112 can additionally or alternately function to structurally support the fuel cell stacks 104, 106 and/or propulsion systems 108 under the influence of various structural stresses (e.g., aerodynamic forces, gravitational forces, propulsive forces, external point loads, distributed loads, and/or body forces, and so forth).

Figure 2:
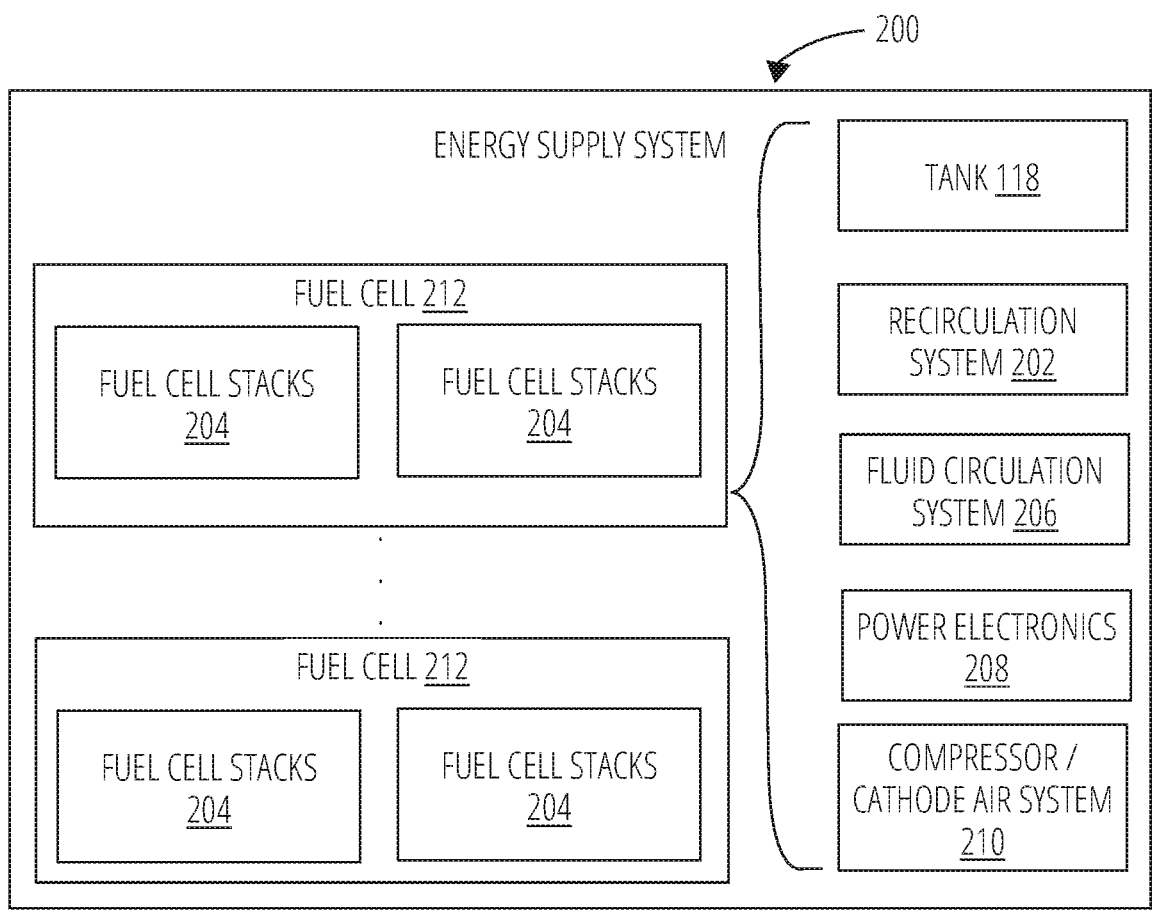
FIG. 2 is a schematic view of an aircraft energy system according to some examples.

FIG. 2 is a schematic view of an aircraft energy supply system 200 according to some examples. As shown, the energy supply system 200 includes one or more fuel cells 212. Each fuel cell 212 may include one or more fuel cell stacks 204.

Typically associated with a fuel cell 212 are a source of hydrogen such as a liquid or compressed gaseous hydrogen tank 118, a recirculation system 202 for supplying and returning hydrogen to the fuel cell 212, a coolant fluid circulation system 206 for transferring heat, power electronics 208 for regulating delivery of electrical power from the fuel cells 212 during operation and to provide integration of the fuel cells 212 with the electronic infrastructure of the aircraft 100, and a compressor/cathode air system 210 for providing compressed air to the fuel cells 212.

The electronic infrastructure can include an energy supply management system, for monitoring and controlling operation of the fuel cells 212.

The fuel cells 212 function to convert chemical energy into electrical energy for supply to the propulsion systems 108. Fuel cells 212 can be arranged and/or distributed about the aircraft in any suitable manner. Fuel cell stacks can be arranged within wings (e.g., inside of an airfoil cavity), inside nacelles, and/or in any other suitable location on the aircraft. In some examples, or more rechargeable battery packs are also provided, in a hybrid fuel cell and battery pack system, in which the propulsion systems 108 are powered jointly or alternately by the fuel cells 212 and battery packs, and in which the fuel cells recharge the battery packs as needed.

The energy supply system 200 can optionally include a heat transfer system (e.g., fluid circulation system 206) and/or that functions to transfer heat from or to various components of the aircraft 100, for example by circulating a working fluid within a fuel cell 212 to remove heat generated during operation, to provide heat for evaporation of liquid hydrogen from the tank 118, or to remove heat from other heat-generating components within the aircraft 100.

Figure 3:
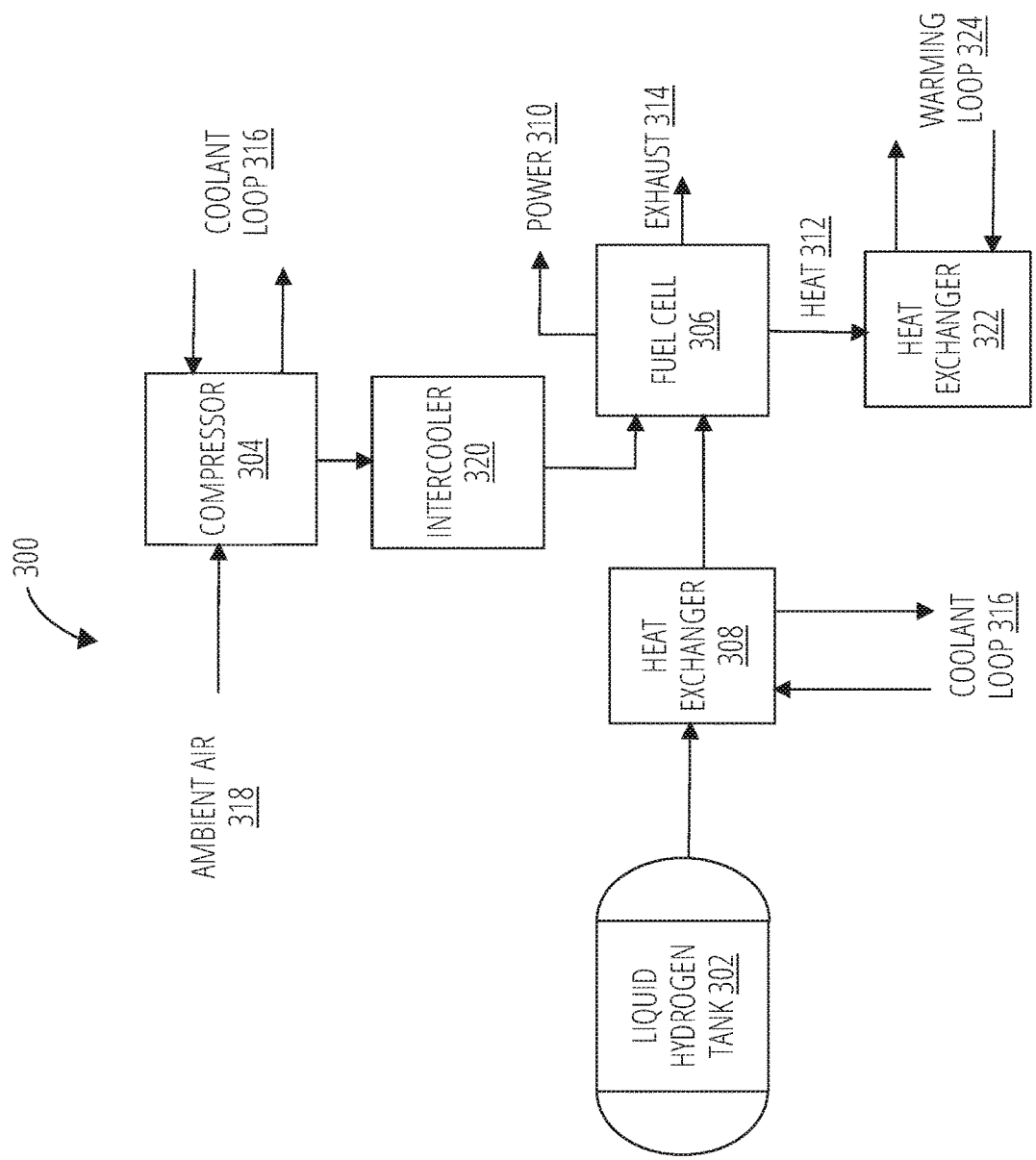
FIG. 3 is a schematic diagram illustrating a hydrogen fuel cell system, according to some examples.

FIG. 3 is a schematic diagram illustrating a hydrogen fuel cell system 300, according to some examples. The fuel cell system 300 comprises a liquid hydrogen tank 302, a heat exchanger 308, a compressor 304 and a fuel cell 306.

The liquid hydrogen tank 302, as its name suggests, stores liquid hydrogen for use in the fuel cell 306. The liquid hydrogen tank 302 is connected to, and supplies liquid hydrogen to the heat exchanger 308, which adds heat to the hydrogen before supplying it to the fuel cell 306.

The heat exchanger 308 provides cooling, via a coolant loop 316, to other heat-generating systems, such as the fuel cell 306 or to the compressor 304, which is used to compress the air containing the oxygen used by the fuel cell 306. The coolant loop 316 includes a coolant liquid that can be circulated to and from a heat source (not shown) to cool the heat source. In some examples, the cold hydrogen gas leaving the liquid hydrogen tank 302 may cool a heat source more directly, for example by having the heat exchanger 308 located at or near the heat source, such as compressor 304.

The compressor 304 compresses ambient air 318 for supply to the fuel cell at the pressure required by the fuel cell 306. Compressing the ambient air 318 increases its temperature. The coolant from the coolant loop 316 may thus be used to precool the ambient air 318 at the inlet of the compressor 304, or to cool the compressor 304 itself. Supplying cooler air to the compressor 304 reduces its power consumption. Air leaving the compressor 304 may be cooled, or cooled further, by an intercooler 320 before being supplied to the fuel cell 306.

Warmer hydrogen gas leaving the heat exchanger 308 is received by the fuel cell, which together with the compressed air received from the compressor 304, generates electrical power 310, heat 312 and a water vapor exhaust 314 as is known in the art. The heat 312 that is generated by the operation of the fuel cell 306 is removed by coolant flowing in a heat exchanger 322, as part of a warming loop 324. The warming loop 324 is used to transfer heat to airflow in a ducted fan as will be described in more detail below.

In some examples the coolant loop 316 is also used to cool the fuel cell 306 in addition to or instead of cooling the ambient air 318 or the compressor 304. Other methods for cooling the fuel cell 306 or the air supplied thereto may be used.

Figure 4:
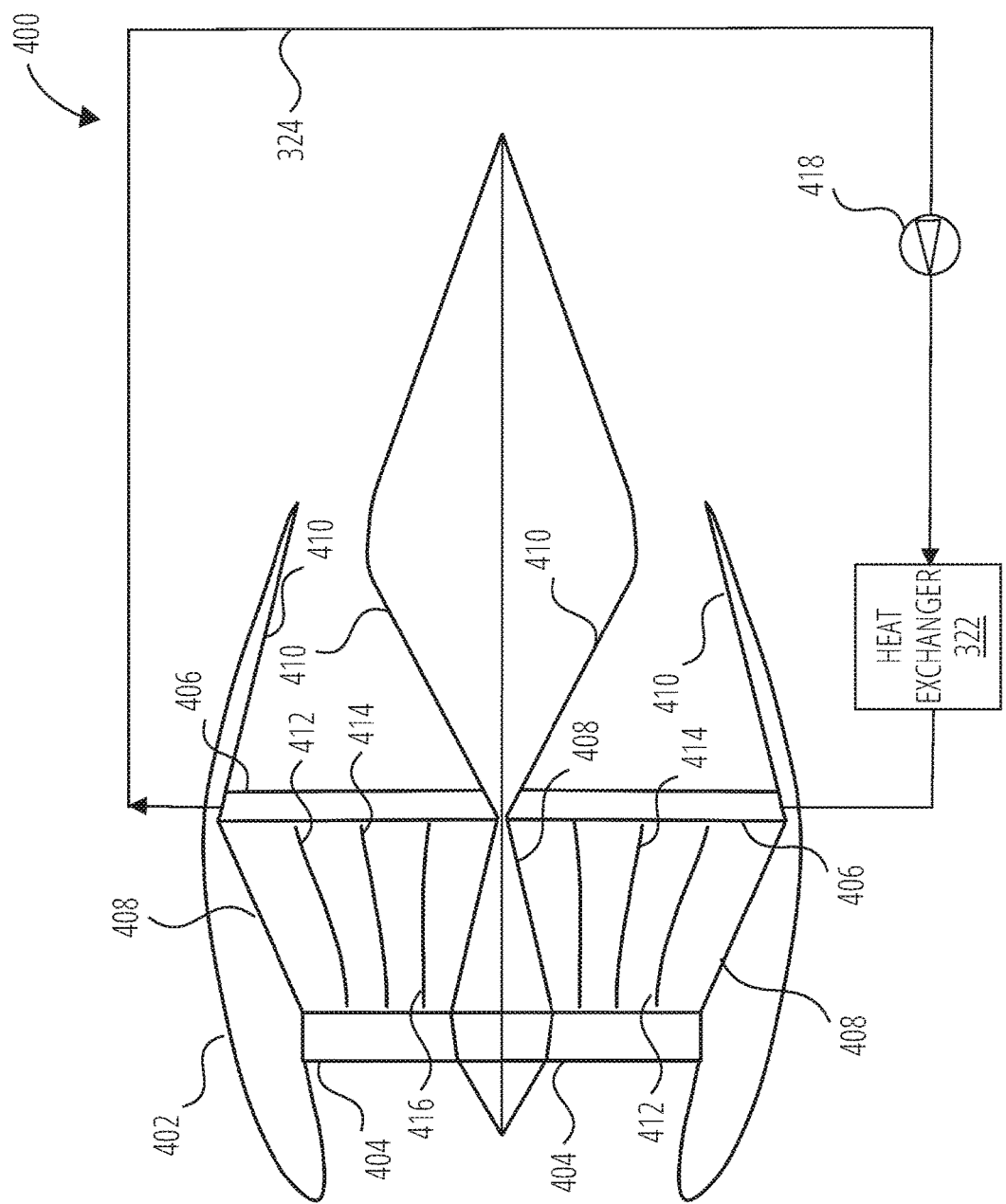
FIG. 4 is a schematic diagram illustrating an integrated cooling system according to some further examples.

FIG. 4 is a schematic diagram illustrating an integrated cooling system 400 according to some further examples. The integrated cooling system 400 includes a duct 402 and a fan 404 used for propelling an aircraft, such as aircraft 100. The fan 404, which is driven by an electric motor located on the center line of the fan 404 and powered by the fuel cells 212 and/or battery packs in use, draws airflow into the duct 402, where it interacts with a heat exchanger 406, which is coupled to the heat exchanger 322 via the warming loop 324. Coolant is circulated through the warming loop 324 and the heat exchanger 406 by a pump 418. Heat generated by operation of the fuel cell 306 is thus transferred, by the coolant in the warming loop 324, from the fuel cell 306 to the airflow in the duct 402.

In some examples the duct 402 is a circular or nearly-circular podded propulsor unit similar in outward appearance to an installed turbofan engine. In another example, the duct 402 may be embedded into the upper surface of a wing as part of an array of ducts.

The exterior shape of duct 402 is aerodynamically tailored to avoid drag-producing aerodynamic effects, such as flow separation or strong shocks. Gentle curvature angles, manipulating the boundary layer (such as by tripping laminar flow), and applying sufficient fan power to avoid spillage drag are some typical aerodynamic tailoring methodologies to improve the exterior shape of duct 402. Alternatively, a numerical optimization procedure based on flow simulations may be pursued.

A diffuser 408, defined by the inner walls of the duct 402, is provided downstream of the fan 404 but upstream of the heat exchanger 406, to decelerate the airflow in the duct 402 before it reaches the heat exchanger 406. Diffusers can take many forms, but a useful diffuser will be short in the flow-wise direction to reduce the wetted area of the outer surface of the duct 502 (or nacelle). However, a diffuser that is too aggressive can result in flow separation. To avoid flow separation, one or more annular splitter vanes 412, 414 and 416 are provided in some examples. The splitters are generally frustoconical in shape, but will not taper in a straight line in cross section as shown in FIG. 4, but in many instances will be curved to provide appropriate aerodynamic tailoring. Additionally, while the cross section of the splitter vanes 412, 414 and 416 perpendicular to the direction of flow in the duct 402 may in some examples be circular, other cross sections are also contemplated. The term frustoconical as used herein is to be interpreted accordingly.

The overall goal is to try to keep the angle between the walls of each splitter vane 412, 414 and 416, and between the splitter vanes 414 and 416 and the inner walls of the duct to about a mid-high single digit value (e.g., 6 to 10 degrees and possibly higher) to avoid flow separation. The number of splitters used will thus depend on the spread angle of the walls forming the diffuser 408 and the targeted degrees of spread per splitter. The splitter inlet and outlet radii are chosen to achieve approximately equal mass flux (mass flow per unit area) at the face of the heat exchanger 406. With the splitter vanes 412, 414 and 416, the flow can remain cleanly attached despite a significant degree of flow diffusion. The actual number and configuration of the splitters will be based on design and optimization choices. More splitters increases internal flow losses but enables a shorter diffuser, which in turn lowers exterior drag losses.

After passing through the heat exchanger 406, the heated airflow is accelerated by a nozzle 410 before leaving the duct

402. Nozzle 410 may either be of the fixed nacelle-and-plug type typical of, for example, turbofan engines, or alternatively it may be a variable area nozzle. A variable area nozzle improves the stall margins of a low-pressure ratio fan at high thrust, low-altitude conditions such as takeoff. Additionally, having a larger nozzle area at sea level takeoff conditions increases the air mass flow rate through the heat exchanger. The additional mass flow improves heat rejection capability at the takeoff design point and may enable a reduction in heat exchanger size.

If nozzle 410 is a variable area nozzle, in some examples it is actuated using a shape memory alloy approach with minimal moving parts, or it uses a multi-leaf annular nozzle mechanism such as those used on some combat aircraft. A typical nozzle area expansion ratio in some examples is approximately 1.10 of the design nozzle area.

As before, heat added to the airflow by the heat exchanger 406 expands the air, resulting in increased thrust generated by the ducted fan. The integrated cooling system 400 thus serves two purposes; heat generated by the fuel cell 306 is removed to cool the fuel cell, and this heat is in turn used to heat and expand the airflow in the duct 402 to provide additional thrust.

The disclosed examples provide an aeropropulsive benefit by using the same flow path for both cooling and propulsion. Since heat exchangers are required to be present somewhere on the aircraft, there will invariably be momentum losses associated with shear stress and pressure losses of the cooling flow path. If thrust is to be added to the flow, it is more efficient to do work on an already existing lossy flow path than it is to generate thrust by pushing on freestream flow. That is the main principle behind boundary layer ingesting propulsors (in which a propulsor ingests and reaccelerates airframe boundary layer air). The disclosed examples adapt that principle to the upcoming class of fuel cell vehicles that have flow momentum losses due to the requirement for larger heat exchangers than used in conventional aircraft.

Additionally, while the disclosed examples show one or more heat exchangers behind a fan, in some examples it may be beneficial to provide one or more heat exchangers in front of a fan. This will not provide quite the same amount of thermal benefit, but might have a configuration benefit, especially for lower-speed applications where the momentum aspect of this concept dominates the thermal benefits.

Figure 5:
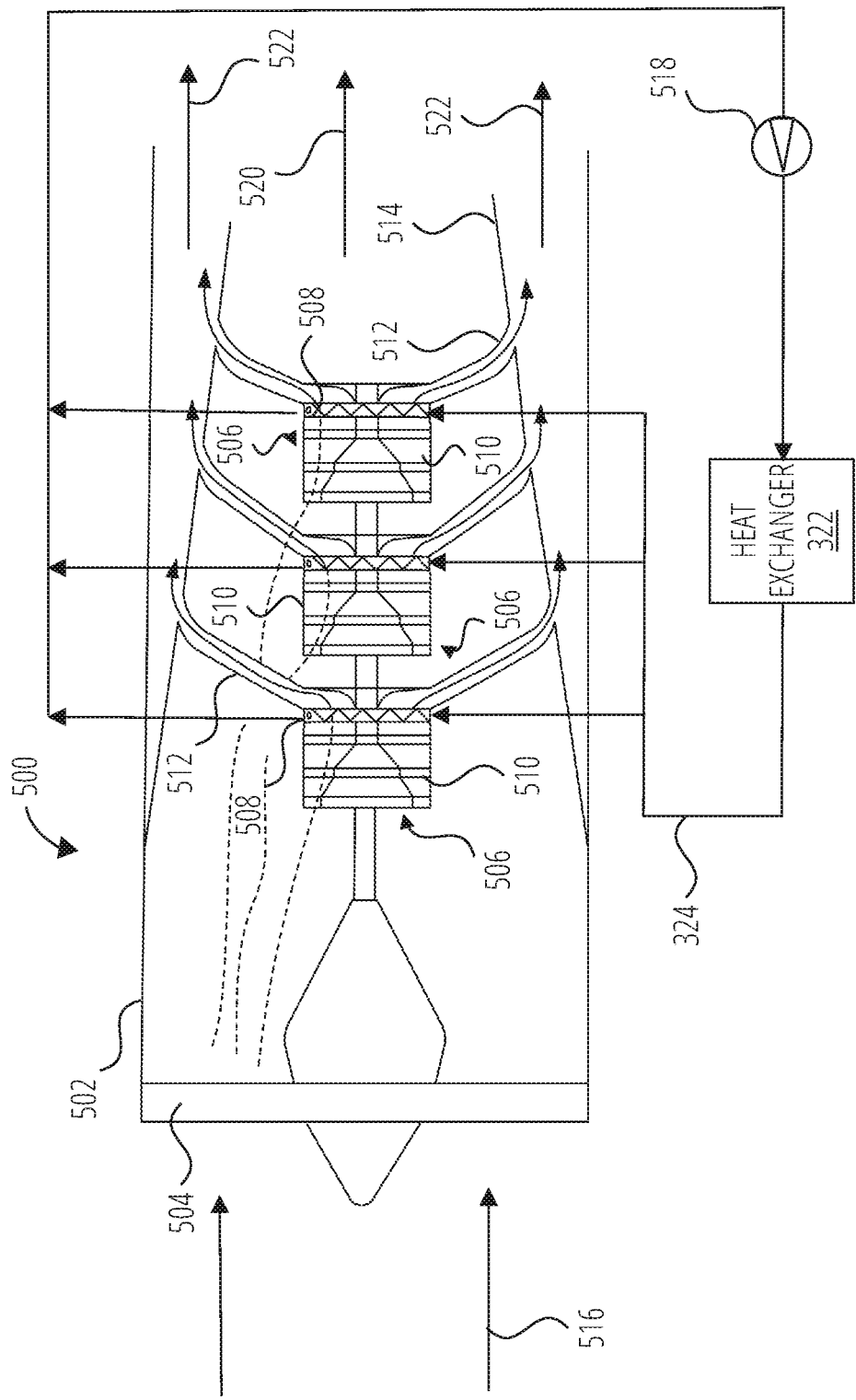
FIG. 5 is a schematic diagram illustrating an integrated cooling system according to some examples.

FIG. 5 is a schematic diagram illustrating an integrated cooling system 500 according to some examples. The integrated cooling system 500 includes a duct 502 and a fan 504 used for propelling an aircraft, such as aircraft 100. The fan 504 draws airflow 516 into the duct 502, where it interacts with one or more (three shown) heat exchange units 506, which are coupled to the heat exchanger 322 via the warming loop 324. Coolant is circulated through the warming loop 324 and the heat exchange units 506 by a pump 518. Heat generated by operation of the fuel cell 306 is thus transferred, by the coolant in the warming loop 324, from the fuel cell to the airflow 516 in the duct 502.

Each heat exchange unit 506 includes a single or multi-stage turbine 510 and a radiator 508. The multistage turbine 510 in each heat exchange unit 506 decelerates part of the airflow in the duct 502 before it passes through the corresponding radiator 508, where heat from the coolant in the warming loop 324 is transferred to the airflow. Air leaving a heat exchange unit 506 is directed to a shroud 514 by one or more secondary conduits 512, to generate a secondary flow 522. The secondary flow 522 rejoins the primary flow 520 and exits the duct 502 via a nozzle downstream (not shown). Heat added to the airflow 516 by the heat exchange units 506 expands the air, resulting in increased thrust generated by the ducted fan. The integrated cooling system 500 thus serves two purposes; heat generated by the fuel cell 306 is removed to cool the fuel cell 306, and this heat is in turn used to heat and expand the airflow in the duct 502 to provide additional thrust.

Whether or not propulsion systems 108 with an integrated cooling system 400, 500 will have greater thrust than the same propulsion systems 108 without such an integrated cooling system will depend on the particular implementation. In particular, there will be a net increase in thrust if the net thrust attributable to the heat transferred to the airflow 516 outweighs the pressure losses across the heat exchange units 506 or heat exchanger 406.

Figure 6:
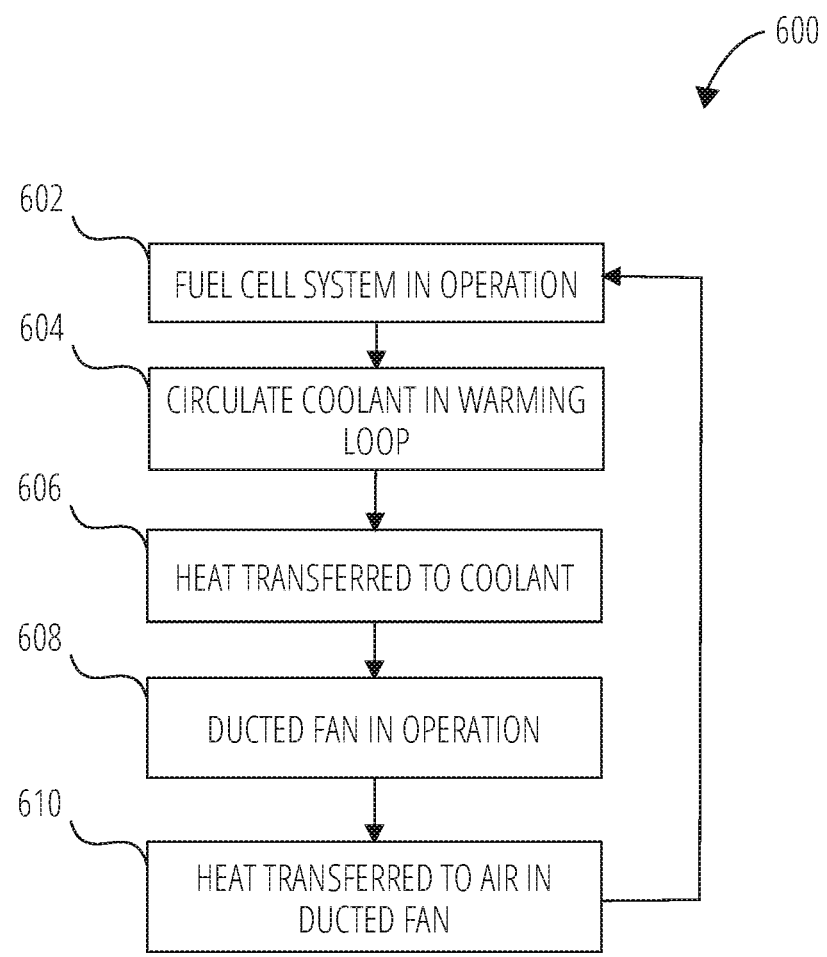
FIG. 6 is a flowchart illustrating operation of the fuel cell system including the integrated cooling system of FIG. 5 and FIG. 4, according to some examples.
Figure 7A:
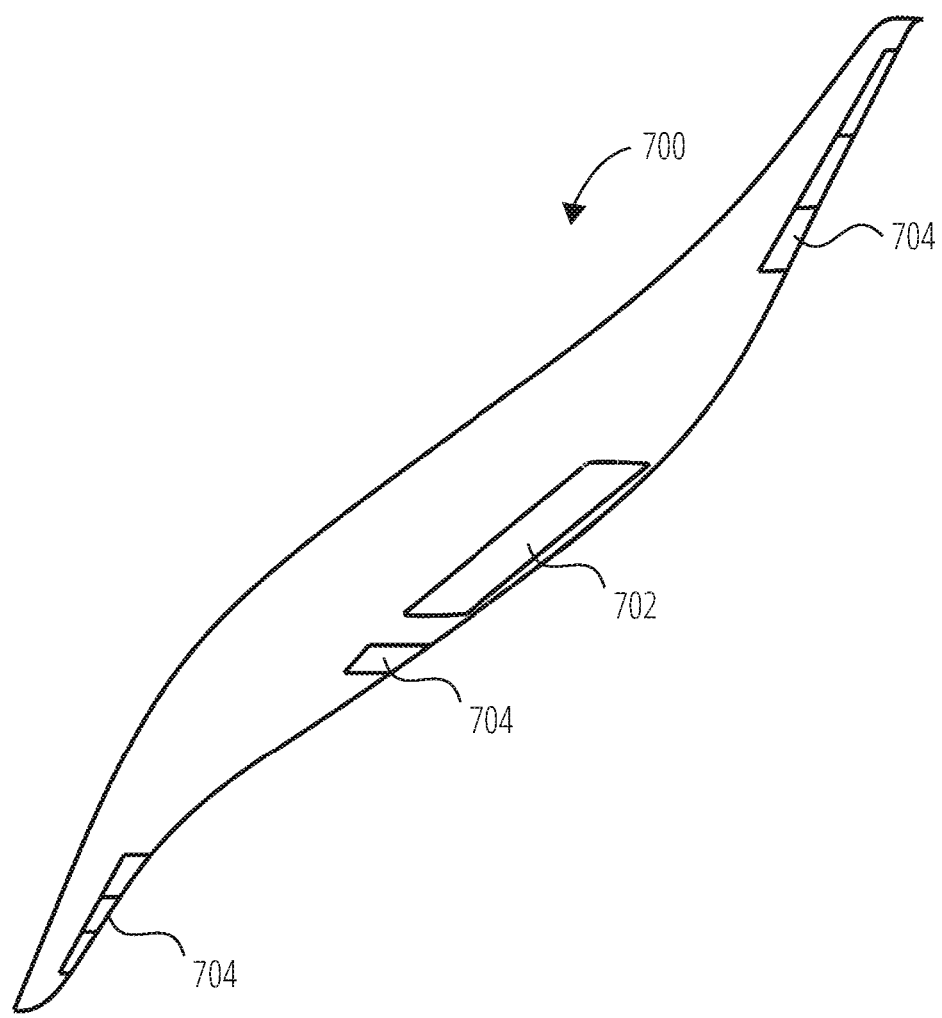
FIG. 7A to FIG. 7D are four views illustrating a rear perspective view, two front perspective views, and a front view respectively of an aircraft 700 comprising a flying wing configuration and ducted propulsion system 702.
Figure 7B:
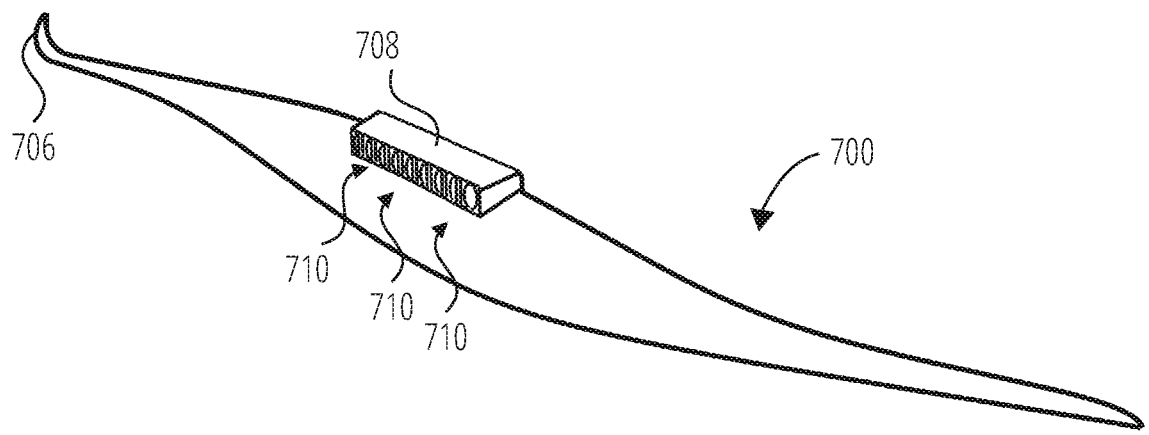
Figure 7C:
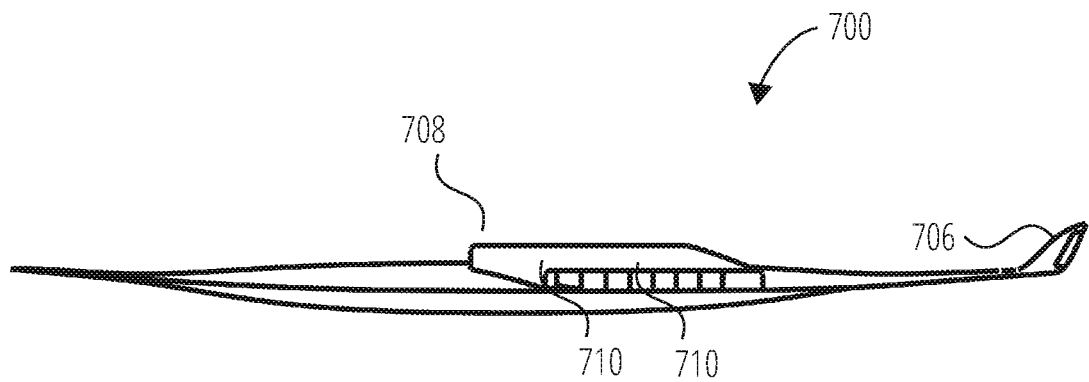
Figure 7D:
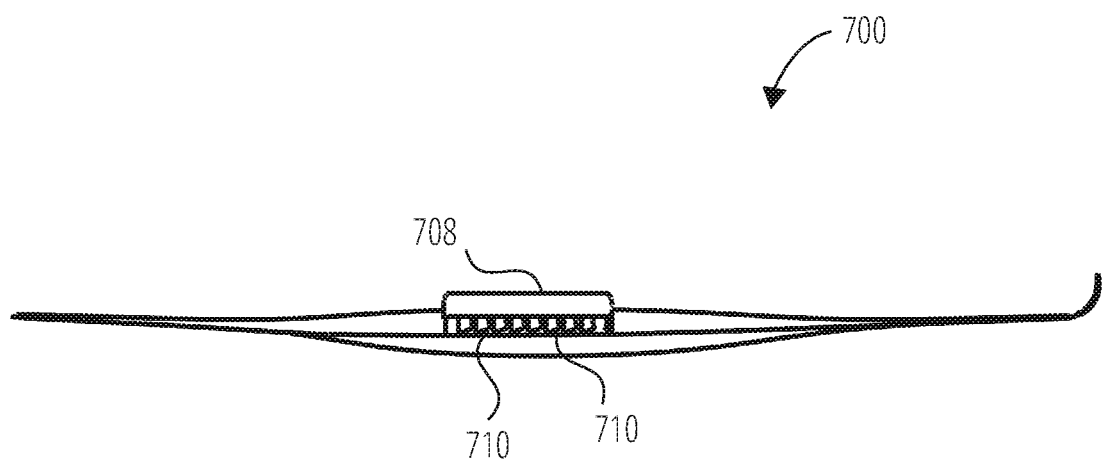

FIG. 6 is a flowchart 600 illustrating operation of the fuel cell system 300 including the integrated cooling system 500, according to some examples. The flowchart is performed by the fuel cell system 300 and integrated cooling system 500, 400 under computer control of the power electronics 208 or other aircraft system processors. The method steps are accomplished by the power electronics 208 providing control signals to corresponding components in the system. The method steps are initiated by the power electronics 208 based at least in part on signals received from sensors located in the systems 300, 500 and/or 400.

The flowchart 600 commences at operation 602 in FIG. 6, in which the fuel cell system 300 is operating. Coolant is circulated in the warming loop 324 in operation 604. Heat 312 generated by the fuel cell 306 is passed to the coolant in warming loop 324 in heat exchanger 322, in operation 606. The ducted fan (fan 504 and duct 502 or fan 404 and duct 402) is operated in operation 608. Heat is passed from the coolant in warming loop 324 to the airflow in a ducted fan via a heat exchanger (e.g., radiators 508 or heat exchanger 406), in operation 610.

The method then returns to operation 602, with the fuel cell in operation, and proceeds from there as long as the fuel cell and the ducted fan are operating.

FIG. 7A to FIG. 7D are four views illustrating a rear perspective view, two front perspective views, and a front view respectively of an aircraft 700 comprising a flying wing configuration and ducted propulsion system 702. Trailing edge control surfaces 704 provide pitch and roll authority and the vertical rudder 706 provides yaw authority. The ducted propulsion system 702 comprises an outer shroud 708 that is further subdivided into one or more flow paths 710 in parallel. Each flow path 710 contains a propulsive propulsor fan 810 (driven by, e.g., an electric motor) a heat exchanger 812 and diffuser vanes as described below with reference to FIG. 8. The propulsion system 702 is arranged in order to ingest boundary layer flow over the upper surface of the wing, increasing propulsive efficiency.

Figure 8:
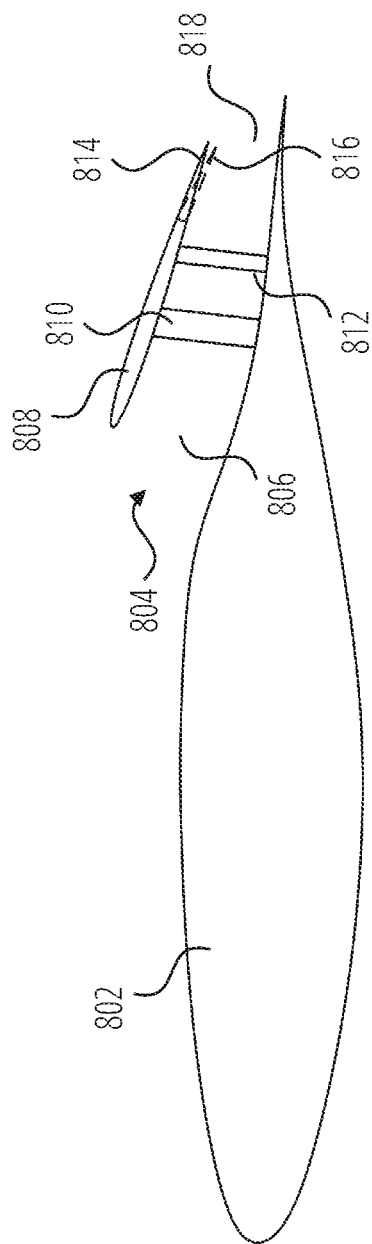
FIG. 8 is a cross-section view generally representative of the aircraft and propulsion system depicted in FIG. 7.

FIG. 8 is a cross-section view generally representative of the aircraft 700 and propulsion system 702 depicted in FIG. 7. The wing cross section comprises a wing forebody 802 (which provides functions typical of wing structure such as structural support, aerodynamic lifting, fuel or payload volume, etc.) as well as a propulsor flow path 804. The propulsor flow path 804 further comprises an inlet 806, a shroud 808, a propulsor fan 810, a heat exchanger 812 and diffuser vanes or splitters (not shown) as described above with reference to FIG. 4.

Placing the heat exchanger 812 aft of the propulsor fan 810 maximizes the thermodynamic benefit of the system by providing heat addition under maximum pressure.

Certain flight regimes may benefit from a variable area nozzle 818 formed by one or more vanes, illustrated in the maximum open position 814. The fully open position 814 affords maximum thrust and cooling airflow at typical takeoff conditions. At cruise conditions, less mass flow is generally required, so the exit nozzle area may be reduced, illustrated by the more closed position 816 of the one or more vanes.

The particular geometry of the wing, lifting surfaces, and propulsion flow path depicted in FIG. 7 and FIG. 8 will depend on requirements for the aircraft's performance (e.g. payload, airspeed, altitude) and a person skilled in the art will be able to tailor the overall aircraft design to the mission at hand within the propulsion architecture described herein.

Figure 9:
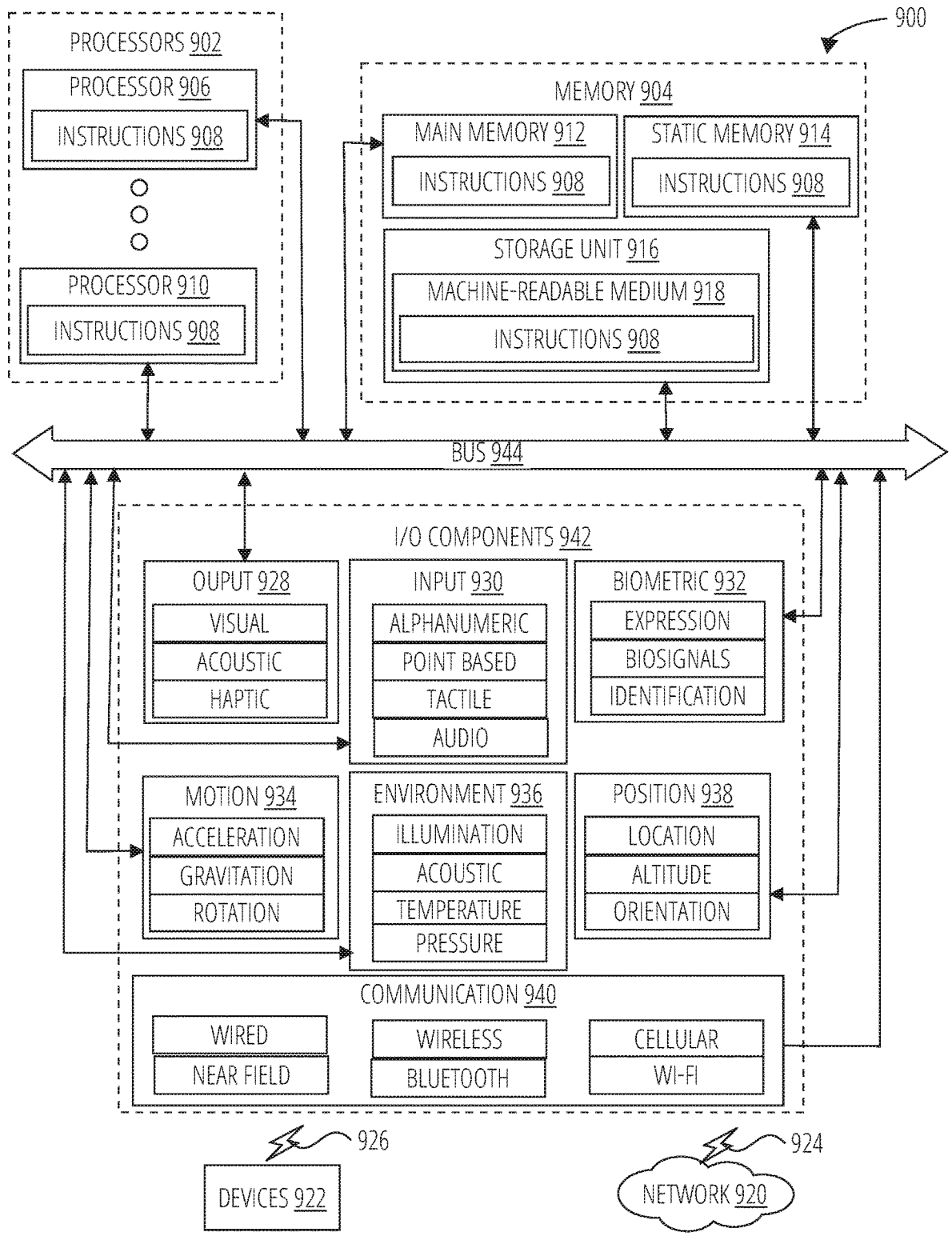
FIG. 9 illustrates a diagrammatic representation of a machine in the form of a computer system within which a set of instructions may be executed for causing the machine to perform any one or more of the methodologies discussed herein, according to some examples.

FIG. 9 illustrates a diagrammatic representation of a machine 900 in the form of a computer system within which a set of instructions may be executed for causing the machine to perform any one or more of the methodologies discussed herein, according to an example. For example, power electronics 208 may be embodied as machine 900.

Specifically, FIG. 9 shows a diagrammatic representation of the machine 900 in the example form of a computer system, within which instructions 908 (e.g., software, a program, an application, an applet, an app, or other executable code) for causing the machine 900 to perform any one or more of the methodologies discussed herein may be executed. The instructions 908 transform the general, non-programmed machine 900 into a particular machine 900 programmed to carry out the described and illustrated functions in the manner described. In alternative examples, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines 900 that individually or jointly execute the instructions 908 to perform any one or more of the methodologies discussed herein.

The machine 900 may include processors 902, memory 904, and I/O components 942, which may be configured to communicate with each other such as via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that may execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 may include a main memory 912, a static memory 914, and a storage unit 916, both accessible to the processors 902 such as via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones will likely include a touch input device or other such input mechanisms, while a headless server machine will likely not include such a touch input device. It will be appreciated that the I/O components 942 may include many other components that are not shown in FIG. 9. The I/O components 942 are grouped according to functionality merely for simplifying the following discussion and the grouping is in no way limiting. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 may include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 904, main memory 912, static memory 914, and/or memory of the processors 902) and/or storage unit 916 may store one or more sets of instructions and data structures (e.g., software) embodying or utilized by any one or more of the methodologies or functions described herein. These instructions (e.g., the instructions 908), when executed by processors 902, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 920 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 920 or a portion of the network 920 may include a wireless or cellular network, and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 908 may be transmitted or received over the network 920 using a transmission medium via a network interface device (e.g., a network interface component included in the communication components 940) and utilizing any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Various examples are contemplated. Example 1 is an aircraft, comprising: a fuel cell system including a fuel cell powered by hydrogen received from a supply of hydrogen; a first heat exchanger to transfer heat generated by the fuel cell to a coolant fluid located in a coolant loop; a propulsion unit including a conduit through which a flow of air is propelled; at least one diffuser vane located in the conduit to decelerate the flow of air in the conduit; and a second heat exchanger located in the conduit for heating the flow of air passing through the conduit by transferring heat to the air from the coolant fluid.

In Example 2, the subject matter of Example 1 includes, a propulsor fan located upstream in the flow of air from the second heat exchanger, the at least one diffuser vane being located in the conduit between the propulsor fan and the second heat exchanger.

In Example 3, the subject matter of Example 2 includes, wherein the second heat exchanger comprises at least one fan for decelerating at least a portion of the flow of air and a radiator downstream from the at least one fan.

In Example 4, the subject matter of Example 3 includes, one or more secondary conduits for directing airflow leaving the radiator out of the conduit.

In Example 5, the subject matter of Examples 1-4 includes, wherein the second heat exchanger comprises a plurality of fans to decelerate at least a portion of the flow of air and a radiator downstream from the plurality of fans.

In Example 6, the subject matter of Example 5 includes, one or more secondary conduits for directing airflow leaving the radiator out of the conduit.

In Example 7, the subject matter of Examples 1-6 includes, wherein the second heat exchanger comprises a plurality of radiators and a plurality of fans upstream from each one of the plurality of radiators.

In Example 8, the subject matter of Examples 1-7 includes, wherein a shape of the conduit defines a diffuser upstream of the second heat exchanger and a nozzle downstream of the second heat exchanger.

In Example 9, the subject matter of Examples 1-8 includes, a variable area nozzle downstream of the second heat exchanger.

In Example 10, the subject matter of Examples 2-9 includes, wherein the at least one diffuser vane comprises a plurality of frustoconical diffuser vanes.

In Example 11, the subject matter of Examples 1-10 includes, a variable area nozzle is downstream of the second heat exchanger.

In Example 12, the subject matter of Examples 1-11 includes, wherein the conduit is embedded in a wing or other lifting surface of the aircraft.

In Example 13, the subject matter of Examples 1-12 includes, wherein the conduit is formed as a podded propulsor unit.

Example 14 is a propulsion unit for an aircraft, comprising: a conduit through which a flow of air is propelled in use; a propulsor fan located in the conduit through which a flow of air is propelled; one or more diffuser vanes located in the conduit to decelerate the flow of air in the conduit; and, a heat exchanger located in the conduit for heating the flow of air passing through the conduit by transferring heat to the air from a coolant fluid.

In Example 15, the subject matter of Example 14 includes, wherein the propulsor fan is located upstream in the flow of air from heat exchanger, the one or more diffuser vanes being located in the conduit between the propulsor fan and the heat exchanger.

In Example 16, the subject matter of Example 15 includes, wherein a shape of the conduit defines a diffuser upstream of the heat exchanger and a nozzle downstream of the heat exchanger.

In Example 17, the subject matter of Examples 14-16 includes, wherein the heat exchanger comprises at least one fan for decelerating at least a portion of the flow of air and a radiator downstream from the at least one fan.

In Example 18, the subject matter of Example 17 includes, one or more secondary conduits for directing airflow leaving the radiator out of the conduit.

In Example 19, the subject matter of Examples 14-18 includes, a variable area nozzle downstream of the heat exchanger.

In Example 20, the subject matter of Examples 14-19 includes, wherein a shape of the conduit defines a diffuser upstream of the heat exchanger and a nozzle downstream of the heat exchanger.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20. Examples of the system and/or method can include combinations and permutations of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

The invention claimed is:
1. An aircraft, comprising:
a fuel cell system including a fuel cell powered by hydrogen received from a supply of hydrogen;
a first heat exchanger to cool the fuel cell by transferring transfer heat generated by the fuel cell to a coolant fluid located in a coolant loop;
an electrical propulsion unit including an electric motor driving a propulsor fan to provide thrust for the aircraft, the electrical propulsion unit being powered solely by electricity, the electricity at least in part being generated by the fuel cell system, the electrical propulsion unit including a conduit through which a flow of air is propelled by operation of the propulsor fan of the electrical propulsion unit; and
a second heat exchanger located in the conduit and coupled to the coolant loop, for heating the flow of air passing through the conduit by transferring heat to the air from the coolant fluid,
wherein the second heat exchanger extends radially outward of the propulsor fan with respect to a centerline axis of the electrical propulsion unit.

2. The aircraft of claim 1, further comprising:
at least one diffuser vane located in the conduit to decelerate the flow of air in the conduit, wherein the propulsor fan is located upstream in the flow of air from the second heat exchanger, the at least one diffuser vane being located in the conduit between the propulsor fan and the second heat exchanger.

3. The aircraft of claim 2, wherein the at least one diffuser vane comprises a plurality of frustoconical diffuser vanes.

4. The aircraft of claim 1, wherein a shape of the conduit defines a diffuser upstream of the second heat exchanger and a nozzle downstream of the second heat exchanger.

5. The aircraft of claim 1, further comprising a variable area nozzle downstream of the second heat exchanger.

6. The aircraft of claim 1, further comprising a variable area nozzle downstream of the second heat exchanger.

7. The aircraft of claim 1, wherein the conduit is embedded in a wing or other lifting surface of the aircraft.

8. The aircraft of claim 1, wherein the conduit is formed as a podded propulsor unit.

9. A propulsion unit for an aircraft, comprising:
a conduit through which a flow of air is propelled in use;
a propulsor fan located in the conduit through which the flow of air is propelled;
an electric motor, powered at least in part in use by a separate fuel cell, for driving the propulsor fan; and
a heat exchanger located in the conduit and coupled to a coolant loop, for heating the flow of air passing through the conduit by transferring heat to the air from a coolant fluid,
wherein, in use, the propulsion unit is powered solely by electricity, the electricity being generated at least in part by the separate fuel cell coupled to the coolant loop and, wherein, in use, the separate fuel cell is cooled by the coolant fluid in the coolant loop,
wherein the heat exchanger extends radially outward of the propulsor fan with respect to a centerline axis of the propulsion unit.

10. The propulsion unit of claim 9, further comprising:
one or more diffuser vanes located in the conduit to decelerate the flow of air in the conduit,
wherein the propulsor fan is located upstream in the flow of air from heat exchanger, the one or more diffuser vanes being located in the conduit between the propulsor fan and the heat exchanger.

11. The propulsion unit of claim 10, wherein a shape of the conduit defines a diffuser upstream of the heat exchanger and a nozzle downstream of the heat exchanger.

12. The propulsion unit of claim 9, further comprising a variable area nozzle downstream of the heat exchanger.

13. The propulsion unit of claim 9, wherein a shape of the conduit defines a diffuser upstream of the heat exchanger and a nozzle downstream of the heat exchanger.

* * * * *